United States Patent

[11] 3,627,391

| [72] | Inventor | Gerald L. Bingle<br>St. Clair Shores, Mich. |
|---|---|---|
| [21] | Appl. No. | 812,141 |
| [22] | Filed | Apr. 1, 1969 |
| [45] | Patented | Dec. 14, 1971 |
| [73] | Assignee | Federal-Mogul Corporation<br>Detroit, Mich. |

[54] COMPOSITE REAR WHEEL BEARING WITH INTEGRAL SEAL
9 Claims, 4 Drawing Figs.

| [52] | U.S. Cl. | 308/187.2 |
|---|---|---|
| [51] | Int. Cl. | F16c 33/78 |
| [50] | Field of Search | 308/187, 187.1, 187.2, 212, 215 |

[56] References Cited
UNITED STATES PATENTS

| 2,102,460 | 12/1937 | Heim | 29/148.4 |
|---|---|---|---|
| 3,353,246 | 12/1967 | Farmer | 29/148.4 |
| 3,423,140 | 1/1969 | Cowles | 308/187.2 |
| 1,871,033 | 8/1932 | Bott | 308/187.2 |
| 3,113,810 | 12/1963 | Brusca | 308/187.1 |

FOREIGN PATENTS

| 716,003 | 9/1954 | Great Britain | 308/187.1 |
|---|---|---|---|
| 878,329 | 9/1961 | Great Britain | 308/213 |

Primary Examiner—Martin P. Schwadron
Assistant Examiner—Frank Susko
Attorney—Harness, Dickey & Pierce ABSTRACT: A roller bearing having a composite or multiple piece outer race with one of the pieces of the race having a seal integral therewith.

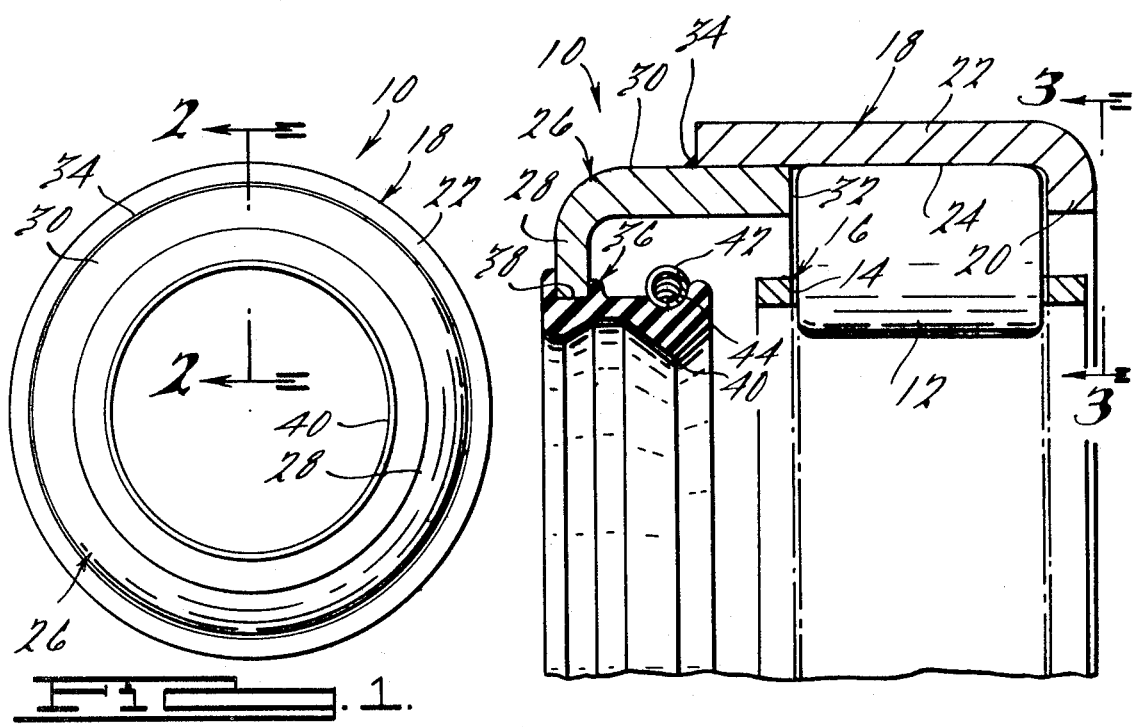
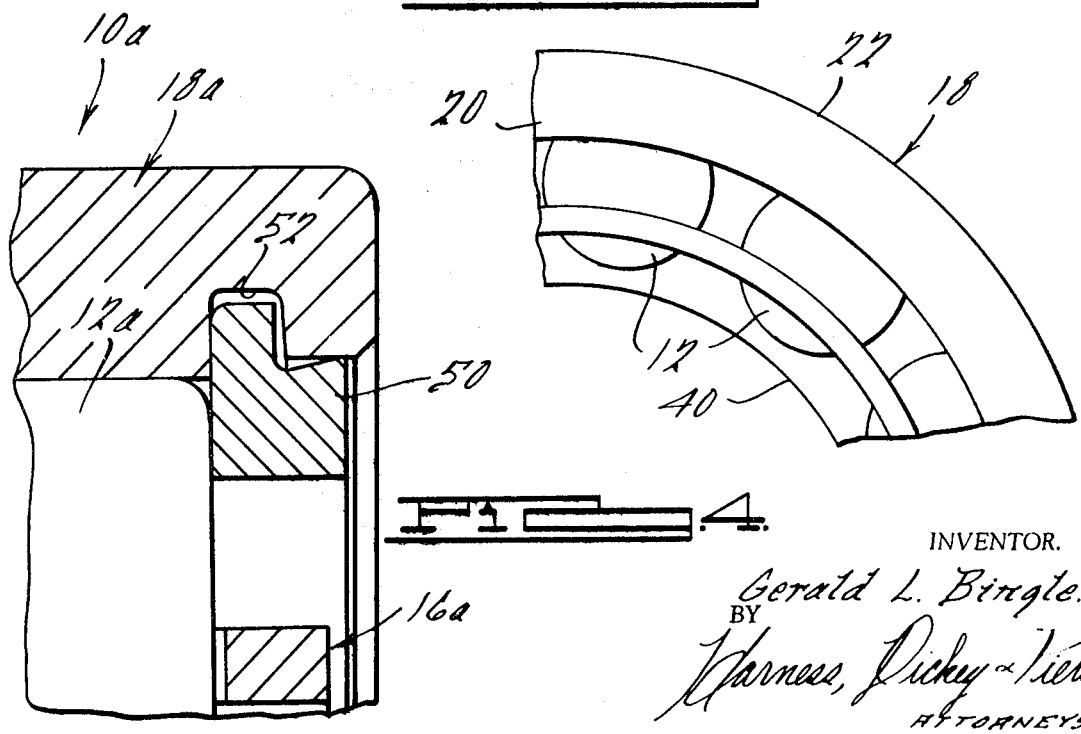

COMPOSITE REAR WHEEL BEARING WITH INTEGRAL SEAL

SUMMARY BACKGROUND OF THE INVENTION

The present invention relates to bearing constructions and more particularly to a bearing construction utilizing a composite race member and integral seal.

In the construction of bearings there has traditionally been a problem of assembling the roller members to a retainer and to a race member. There have also been problems with regard to the assembly of a seal for retaining the lubricant within the bearing assembly. In the present invention a novel construction is provided utilizing a composite race construction whereby assembly of the roller and cage to the race is simplified as well as resulting in simplification in the provision of the seal. Therefore, it is an object of the present invention to provide a novel bearing assembly utilizing a composite race assembly having a seal member integral therewith.

It is another object of the present invention to provide a novel bearing assembly.

Other objects, feature, and advantages of the present invention will become apparent from the subsequent description and the appended claims, taken in conjunction with the accompanying drawings, in which:

FIG. 1 is a side elevational view of a bearing assembly embodying features of the present invention;

FIG. 2 is a sectional view to enlarged scale of the bearing assembly of FIG. 1, taken generally along the lines 2—2;

FIG. 3 is a partial view of the bearing assembly taken generally along the lines 3—3; and FIG. 4 is a fragmentary view of a modified form of the bearing assembly.

Looking now to FIGS. 1-3, a bearing assembly is generally indicated by the numeral 10 and includes a plurality of straight cylindrical rollers 12 which are located within a plurality of pockets 14 in a retainer member 16. The retainer member 16 can be of a generally straight cylindrical or circular shape with the pockets 14 having a circumferential width slightly less than the diameter of the rollers 12 whereby the rollers 12 will be retained therein. The subassembly of the rollers 12 and cage 16 is located within a composite outer race assembly which includes a first generally cup-shaped member 18 which has a radially inwardly extending flange portion 20 and a circumferentially, axially extending portion 22. The portion 22 defines a raceway 24 while the portion 20 defines a shoulder for axially retaining, in one axial direction, the subassembly of rollers 12 and cage 16. The open end of the cup-shaped member 18 has a second cup-shaped member 26 matably located therein with the cup-shaped member 26 having a radially inwardly extending flange portion 28 and a circumferentially, axially extending portion 30. The circumferentially extending portion 30 is generally matably locatable within the circumferentially extending portion 22 of the cup-shaped member 18 with its innermost end 32 defining a shoulder for axially retaining the subassembly of rollers 12 and cage 16 from axial movement in an opposite direction. The cup-shaped members 18 and 26 are retained together by means of a circumferentially extending weld 34. Thus note that with the construction shown the bearing assembly 10 can be easily assembled with the rollers 12 being readily assembled within the pockets 14 of the cage 16.

The cup-shaped member 26 is provided with an annular seal 36 which has a groove 38 which receives the radially innermost extremity of the radial portion 28, with the seal 36 being vulcanized or otherwise bonded thereto. The annular seal 36 has an annular, radially inwardly extending sealing lip portion 40 for engagement with a shaft or other member upon which the bearing assembly 10 is to be mounted. An annular spring member 42 is located in a groove 44 in the seal 36 generally in the area of the sealing lip 40 such as to provide for good gripping engagement of the sealing lip 40 with the member to which it is assembled.

It can be seen that the entire bearing and seal assembly can be mounted with only one assembly operation. In prior constructions a separate seal assembly has been provided thereby requiring separate means for retaining the seal and separate assembly steps. Also with the bearing assembly 10 as shown, relatively inexpensive components can be utilized, i.e., such as the straight, circular cage 16 and the relatively simple to form cup-shaped members 26 and 18, resulting in a generally inexpensive bearing assembly.

A modified form of the bearing assembly of FIGS. 1 to 3 is shown in FIG. 4, where components similar to like components shown in embodiments of FIGS. 1 to 3 have been given the same numerical designation with the addition of a letter postscript "a." Thus the subassembly of rollers 12a and cage 16a is assembled to a modified annular member 18a which has a split, annular retainer ring 50 (in place of the radially inwardly extending portion 20) for axially retaining that subassembly. The split ring retainer 50 is located within a stepped groove 52 at the axially outer end of the member 18a and hence is positively held therein and functions to axially retain the subassembly as noted. The remainder of the bearing assembly is generally the same as shown in FIGS. 1 to 3.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A bearing assembly comprising: a plurality of rollers, a cage for retaining said rollers, a race assembly comprising a first one piece cup shape annular member having a uniform thickness and defining an annular raceway for said rollers, said first member including a radially inwardly extending flange portion located at one end of said first member for axially retaining said rollers and cage in one axial direction, a second annular member secured to said first member and at least partially nested within the opposite end of said first member for defining a shoulder axially retaining said rollers and cage in the other axial direction, said second member having a second radially extending portion, and further comprising an annular seal bonded to said second radially extending portion.

2. The assembly of claim 1, with said cage defining generally a straight cylinder and with said raceway being a radially outer raceway.

3. The assembly of claim 2 with said rollers being cylindrical rollers and with said first member having a straight cylindrical portion defining said raceway.

4. A bearing assembly comprising: a plurality of rollers, a cage for retaining said rollers, a race assembly comprising a first annular, one piece, cup-shaped member having a first axially extending portion defining a raceway and a first radially inwardly extending flange at one end engageable with said rollers for axially retaining said rollers and cage in one direction, said first annular member having a generally uniform thickness, a second annular member secured to said first member and having a second axially extending portion at least partially nested within the opposite end of said first annular member for defining a shoulder at one end engageable with said rollers for axially retaining said rollers and cage in the other axial direction, said second annular member being a one piece, cup-shaped member having a second radially inwardly extending flange at the opposite end.

5. The assembly of claim 4 further including seal means fixed to the radially inner end of said second flange.

6. The assembly of claim 5 with each said second annular members having a generally uniform thickness.

7. A bearing assembly comprising: a plurality of rollers, a cage for retaining said rollers, a race assembly comprising a first annular member defining an annular raceway for said rollers and including an axially straight, smooth surfaced raceway portion, retaining means located at one end of said first member for axially retaining said rollers and cage in one axial direction, a second annular member secured to said first member and having an axially straight annular portion extending at least partially coextensively with said smooth raceway portion whereby said second annular member is at least partially nested within the opposite end of said first member for defining a shoulder axially retaining said rollers and cage in the other axial direction, each said first and second annular members having a uniform thickness, said second annular member having a radially extending leg portion and an annular seal bonded proximate the radial extremity of said leg portion whereby said second annular member and said annular seal together define a seal assembly which can be assembled as a unit with said first annular member, and weld means fixing said first and second annular members together.

8. A bearing assembly comprising: a plurality of rollers, a cage for retaining said rollers, a race assembly comprising a first annular member defining an annular raceway for said rollers, retaining means located at one end of said first member for axially retaining said rollers and cage in one axial direction, a second annular member secured to said first member and at least partially nested within the opposite end of said first member for defining a shoulder axially retaining said rollers and cage in the other axial direction, each said first and second annular members having a uniform thickness, both said first and second annular member being of a one piece, cup-shaped construction.

9. A bearing assembly comprising: a plurality of rollers, a cage for retaining said rollers, a race assembly comprising a first one piece annular member defining an annular raceway for said rollers, retaining means located at one end of said first member for axially retaining said rollers and cage in one axial direction, said retaining means comprising a split retaining ring located in a groove in said first member, a second annular member secured to said first member and at least partially nested within the opposite end of said first member for defining a shoulder axially retaining said rollers and cage in the other axial direction, said second annular member having a radially extending leg portion and an annular seal bonded proximate the radial extremity of said leg portion whereby said second annular member and said annular seal together define a seal assembly which can be assembled as a unit with said first annular member, and weld means fixing said first and second annular members together.

* * * * *